United States Patent
Narayanan et al.

(10) Patent No.: US 12,402,034 B2
(45) Date of Patent: Aug. 26, 2025

(54) WIRELESS OUT-OF-BAND MANAGEMENT OF INFORMATION TECHNOLOGY ASSETS

(71) Applicant: Dell Products L.P., Round Rock, TX (US)

(72) Inventors: Padmanabhan Narayanan, Redmond, WA (US); Per Henrik Fremrot, Novato, CA (US)

(73) Assignee: Dell Products L.P., Round Rock, TX (US)

( * ) Notice: Subject to any disclaimer, the term of this patent is extended or adjusted under 35 U.S.C. 154(b) by 402 days.

(21) Appl. No.: 17/865,557

(22) Filed: Jul. 15, 2022

(65) Prior Publication Data
US 2024/0022960 A1 Jan. 18, 2024

(51) Int. Cl.
*H04W 28/082* (2023.01)
*H04W 28/086* (2023.01)

(52) U.S. Cl.
CPC ..... *H04W 28/082* (2023.05); *H04W 28/0866* (2023.05)

(58) Field of Classification Search
CPC .......... H04W 28/082; H04W 28/0866; H04W 52/00; H04B 2203/54; H04L 12/28; H04L 12/2856; H04L 12/4633; H04L 12/4641; H04L 12/46; H04L 12/185; H04L 41/344; H04L 41/0984; H04L 41/0806; H04L 41/04; H04L 41/12; H04L 41/0213; H04L 41/00; H04L 41/0803; H04L 41/34; H04L 41/08; H04L 41/046; H04L 45/64; H04L 45/04; H04L 63/0272; H04L 63/1408; H04L 43/00
USPC .......................................... 370/229; 709/223
See application file for complete search history.

(56) References Cited

U.S. PATENT DOCUMENTS

| | | | |
|---|---|---|---|
| 10,785,652 B1* | 9/2020 | Ravindranath | H04W 12/48 |
| 11,233,692 B2 | 1/2022 | Narayanan et al. | |
| 2003/0101239 A1 | 5/2003 | Ishizaki | |
| 2007/0206630 A1* | 9/2007 | Bird | H04L 41/24 370/465 |
| 2008/0072291 A1 | 3/2008 | Carley | |

(Continued)

FOREIGN PATENT DOCUMENTS

WO  WO-2012094129 A1 * 7/2012 ............ H04W 24/10

OTHER PUBLICATIONS

G. Rieger, "socat (1)—Linux Man Page," https://linux.die.net/man/1/socat, Accessed Jul. 15, 2022, 33 pages.

*Primary Examiner* — Ricardo H Castaneyra
(74) *Attorney, Agent, or Firm* — Ryan, Mason & Lewis, LLP

(57) ABSTRACT

An apparatus comprises two or more connection ports, at least one wireless network interface, and at least one processing device comprising a processor coupled to a memory. The at least one processing device is configured to receive, utilizing a first one of the two or more connection ports, a first type of out-of-band management traffic from a managed information technology asset, to receive, utilizing a second one of the two or more connection ports, a second type of out-of-band management traffic from the managed information technology asset, and to communicate, via the at least one wireless network interface, the first and second types of out-of-band management traffic to one or more additional processing devices.

20 Claims, 10 Drawing Sheets

(56) References Cited

U.S. PATENT DOCUMENTS

| | | | |
|---|---|---|---|
| 2010/0281094 A1* | 11/2010 | Holt | H04L 41/344 709/201 |
| 2014/0204955 A1 | 7/2014 | Kelly | |
| 2014/0362859 A1 | 12/2014 | Addanki et al. | |
| 2017/0230251 A1* | 8/2017 | Dube | H04L 67/1097 |
| 2017/0244640 A1 | 8/2017 | Lin et al. | |
| 2021/0044563 A1 | 2/2021 | Reyes et al. | |
| 2022/0116260 A1 | 4/2022 | Narayanan et al. | |

* cited by examiner

WIRELESS OUT-OF-BAND MANAGEMENT OF INFORMATION TECHNOLOGY ASSETS

FIELD

The field relates generally to information processing, and more particularly to management of information processing systems.

BACKGROUND

As the value and use of information continues to increase, individuals and businesses seek additional ways to process and store information. Information handling systems may be used to process, compile, store and communicate various types of information. Because technology and information handling needs and requirements vary between different users or applications, information handling systems may also vary (e.g., in what information is handled, how the information is handled, how much information is processed, stored, or communicated, how quickly and efficiently the information may be processed, stored, or communicated, etc.). Information handling systems may be configured as general purpose, or as special purpose configured for one or more specific users or use cases (e.g., financial transaction processing, airline reservations, enterprise data storage, global communications, etc.). Information handling systems may include a variety of hardware and software components that may be configured to process, store, and communicate information and may include one or more computer systems, data storage systems, and networking systems.

SUMMARY

Illustrative embodiments of the present disclosure provide techniques for wireless out-of-band management of information technology assets.

In one embodiment, an apparatus comprises two or more connection ports, at least one wireless network interface, and at least one processing device comprising a processor coupled to a memory. The at least one processing device is configured to receive, utilizing a first one of the two or more connection ports, a first type of out-of-band management traffic from a managed information technology asset, to receive, utilizing a second one of the two or more connection ports, a second type of out-of-band management traffic from the managed information technology asset, and to communicate, via the at least one wireless network interface, the first and second types of out-of-band management traffic to one or more additional processing devices.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
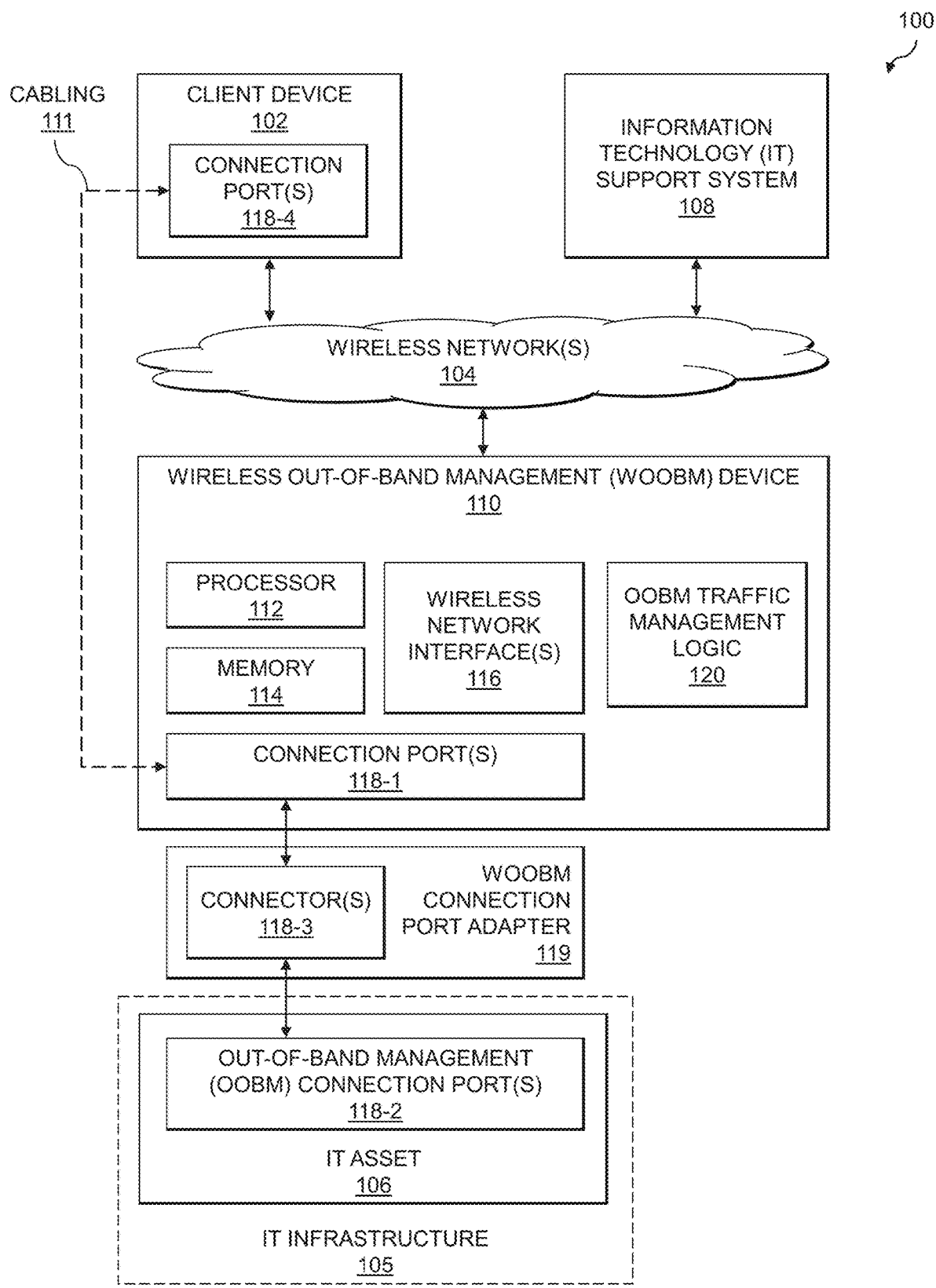
FIG. 1 is a block diagram of an information processing system configured for wireless out-of-band management of information technology assets in an illustrative embodiment.

FIG. 1 shows an information processing system 100 configured in accordance with an illustrative embodiment. The information processing system 100 is assumed to be built on at least one processing platform and provides functionality for wireless out-of-band management (WOOBM) of information technology (IT) assets of an IT infrastructure 105, such as IT asset 106, using a WOOBM device 110. The WOOBM device 110 is coupled, via one or more networks 104, to a client device 102 and an IT support system 108. Out-of-band management (OOBM) for the IT asset 106 refers to management of the IT asset 106 that is at least partially under the control or direction of another device (e.g., an "out-of-band" device such as WOOBM device 110, the IT support system 108, via a management network that includes one or both of the WOOBM device 110 and the IT support system 108, etc.), as compared with management of the IT asset 106 that is entirely under the control or direction of the IT asset 106 itself (e.g., "in band"). OOBM may include servicing, configuration and other management actions that are controlled or directed by an "out-of-band" device.

The IT asset 106 may include one or more physical and/or virtual computing resources. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. In various embodiments described herein, it is assumed that the IT asset 106 comprises a network switch that is managed by the client device 102 and/or IT support system 108 utilizing the WOOBM device 110.

The WOOBM device 110 comprises a processor 112, a memory 114, one or more wireless network interfaces 116 and connection ports 118-1. Two or more of the connection ports 118-1 of the WOOBM device 110 are configured for mating with OOBM connection ports 118-2 of the IT asset 106, possibly via a WOOBM connection port adapter 119 having corresponding connectors 118-3. In some embodiments, the OOBM connection ports 118-2 of the IT asset 106 a management port and a console port. At least one of the connection ports 118-1 of the WOOBM device 110 are configured for mating with corresponding connection ports 118-4 of the client device 102 via cabling 111. The connection ports 118-4 of the client device 102 may include, for example, flash drive or debug console ports, Universal Serial Bus (USB) ports, etc.

It should be noted that the coupling of the client device 102 to the WOOBM device 110 via cabling 111 is optional. The client device 102 may also or alternatively be coupled to the WOOBM device 110 via the one or more wireless networks 104, such as cellular (e.g., Long Term Evolution (LTE), 5G, etc.) networks, WiFi (e.g., WiFi 6) networks, other short-range wireless networks (e.g., Bluetooth, Bluetooth Low Energy (BLE), Near Field Communication (NFC), etc.). The WOOBM device 110 is also configured for coupling via the wireless networks 104 to the IT support system 108. The wireless networks 104 coupling the IT support system 108 to the WOOBM device 110 may be the same as or different than those used for coupling the client device 102 to the IT support system 108.

The IT support system 108 may be operated by an enterprise or other entity that provides support services for the IT infrastructure 105. The enterprise or other entity that provides support services for the IT infrastructure 105 may be the same as or different than the enterprise or other entity that operates the IT infrastructure 105. For example, an enterprise or other entity operating the IT infrastructure 105 may subscribe to or otherwise utilize the IT support system 108 for providing support or management services for the IT asset 106. In some cases, the IT support system 108 is operated by a vendor of the IT asset 106. As used herein, the term "enterprise system" is intended to be construed broadly to include any group of systems or other computing devices. For example, the IT asset 106 of the IT infrastructure 105 may provide a portion of one or more enterprise systems. A given enterprise system may also or alternatively include the client device 102 and/or the IT support system 108. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client device 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client device 102 may also or alternately comprise virtualized computing resources, such as VMs, containers, etc.

The client device 102 in some embodiments comprises a computer associated with a particular company, organization or other enterprise. Thus, the client device 102 may be considered an example of an asset of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

Although not explicitly shown in FIG. 1, one or more input-output devices such as keyboards, displays or other types of input-output devices may be used to support one or more user interfaces to the client device 102, the IT support system 108, the WOOBM device 110, and the IT asset 106, as well as to support communication between these elements and other related systems and devices not explicitly shown.

The client device 102 is configured to access or otherwise utilize the IT infrastructure 105. In some embodiments, the client device 102 is assumed to be associated with a system administrator, IT manager or other authorized personnel responsible for managing the IT asset 106 of the IT infrastructure 105 (e.g., where such management includes performing servicing of the IT asset 106, or of applications or other software that runs on the IT asset 106). The IT support system 108 may also be used to provide management or other support for the IT asset 106 of the IT infrastructure. In some embodiments, the IT asset 106 of the IT infrastructure 105 is owned or operated by the same enterprise that operates the client device 102 and/or the IT support system 108 (e.g., where an enterprise such as a business provides support for the assets it operates). In other embodiments, the IT asset 106 of the IT infrastructure 105 may be owned or operated by one or more enterprises different than the enterprise which operates the client device 102 and/or the IT support system 108 (e.g., a first enterprise provides support for assets that are owned by multiple different customers, business, etc.). Various other examples are possible.

In some embodiments, the client device 102 and/or IT asset 106 may implement host agents that are configured for automated transmission of information that is to be provided to the IT support system 108. Such host agents may also or alternatively be configured to automatically receive from the IT support system 108 management or configuration commands or other information. It should be noted that a "host agent" as this term is generally used herein may comprise an automated entity, such as a software entity running on a processing device. Accordingly, a host agent need not be a human entity.

The client device 102, IT support system 108, WOOBM device 110, IT asset 106 and other elements of the information processing system 100 in the FIG. 1 embodiment are assumed to be implemented using at least one processing device. Each such processing device generally comprises at least one processor and an associated memory, and implements one or more functional modules or logic for controlling certain features of the information processing system 100. In the FIG. 1 embodiment, for example, the WOOBM device 110 comprises a processor 112 and memory 114 that implements OOBM traffic management logic 120. At least portions of the OOBM traffic management logic 120 may be implemented at least in part in the form of software that is stored in memory 114 and executed by processor 112. The OOBM traffic management logic 120 is configured to receive, utilizing a first one of the connection ports 118-1, a first type of OOBM traffic from managed IT asset 106. The OOBM traffic management logic 120 is also configured to receive, utilizing a second one of the connection ports 118-2, a second type of OOBM traffic from the managed IT asset 106. The OOBM traffic management logic 120 is further configured to communicate, via the wireless network interfaces 116, the first and second types of OOBM traffic to one or more additional processing devices (e.g., client device 102, IT support system 108). The OOBM traffic management logic 120 may be further configured to receive, via the wireless network interfaces 116, additional OOBM traffic from at least one of the one or more additional processing devices, and to separate the additional OOBM traffic into the first type of OOBM traffic and the second type of OOBM traffic. The first type of OOBM traffic in the additional OOBM traffic may be communicated utilizing the first connection port to a first one of the OOBM connection ports 118-2 of the managed IT asset 106, and the second type of OOBM traffic in the additional OOBM traffic may be communicated utilizing the second connection port to a second one of the OOBM connection ports 118-2 of the managed IT asset 106.

It is to be appreciated that the particular arrangement of the client device 102, the IT infrastructure 105, the IT support system 108, the WOOBM device 110, and the WOOBM connection port adapter 119 illustrated in the FIG. 1 embodiment is presented by way of example only, and alternative arrangements can be used in other embodiments. As discussed above, for example, the WOOBM connection port adapter 119 is optional. In some cases, the connection ports 118-1 of the WOOBM device 110 are coupled to the OOBM connection ports 118-2 of the IT asset 106 directly or via cabling rather than via the WOOBM connection port adapter 119.

The IT support system 108 and other portions of the system 100, as will be described in further detail below, may be part of cloud infrastructure.

The client device 102, the IT infrastructure 105, the IT support system 108, the WOOBM device 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client device 102, the IT infrastructure 105, the IT support system 108, the WOOBM device 110, or components thereof or other components of the information processing system 100 in the FIG. 1 embodiment, may be implemented on respective distinct processing platforms, although numerous other arrangements are possible. For example, in some embodiments at least portions of the client device 102 and the IT support system 108 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for client device 102, the IT infrastructure 105, the IT support system 108, the WOOBM device 110, or portions or components thereof, to reside in different data centers. Numerous other distributed implementations are possible.

Additional examples of processing platforms utilized to implement components of the system 100 in illustrative embodiments will be described in more detail below in conjunction with FIGS. 9 and 10.

It is to be appreciated that these and other features of illustrative embodiments are presented by way of example only, and should not be construed as limiting in any way.

It is to be understood that the particular set of elements shown in FIG. 1 for WOOBM of IT assets is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

OOBM data may originate from multiple different ports of a managed IT asset (e.g, a network switch), such as serial data from a console port and ethernet traffic from a management port. Managing such OOBM data or traffic using two different networks is cumbersome and inefficient. Conventional approaches have attempted to provide a remedy utilizing processors that provide Serial-Over-LAN (SOL) access. Such conventional approaches, however, suffer from various technical problems and challenges, including the need to set up and manage a dynamic host control protocol (DHCP) server as part of a management network, distributing assigned SOL IP addresses, etc. Further, not all existing network switches or other IT assets support SOL in hardware. Accordingly, there is a need for technical solutions for accessing OOBM ports of a managed IT asset to perform support of management of that managed IT asset. This may include using unified management server ports on an OOBM device to handle or reach both console and management traffic.

5G evolution and deployments are happening at a rapid pace, and are transforming the way networks are being designed. Cloud operators may offer "Private 5G" fully managed services for the enterprise and edge. With the deployment of 5G, the use of disaggregated network switches in these environments presents new opportunities as well as challenges. Various IT assets, including network switches, support OOBM with multiple ports (e.g., a console port and an ethernet or other management port). Hyperscalers have realized capital expenditure (CapEx) and operating expense (OpEx) benefits of consolidating ethernet and console management networks. With private 5G, there are clear synergistic benefits in integrating the OOBM access of the network switches into the radio access network (RAN) itself.

There are various technical challenges associated with wired OOBM usage (e.g., for both ethernet and console OOBM). In some environments, console connectivity is available only on request (e.g., console servers are not deployed to cut cost and/or cabling overhead). If units do not respond over a management network (e.g., over an ethernet port), OOBM operations must wait for a customer's data center personnel to get physical access and schedule debug sessions (e.g., facilitated by connecting a laptop's COM port). Further, in many cases (e.g., file system and/or partition corruptions, SSD failures, etc.), the managed IT asset may be stuck in its basic input/output system (BIOS). In such cases, the only way to jump-start the managed IT asset (e.g., to avoid return merchandise authorization (RMA)) would be using a bootable universal serial bus (USB) (e.g., with Open Network Install Environment (ONIE) or Diagnostic Operating System (DIAG-OS) capabilities), which requires a technician to have physical access to the console of the managed IT asset.

Additional technical challenges relate to customers or end-users (e.g., including large enterprises and hyperscalers) wanting to focus on their applications or business logic rather than component firmware upgrades (e.g., for BIOS, complex programmable logic devices (CPLDs), field-programmable gate arrays (FPGAs), baseboard management controllers (BMCs), etc.). Even if upgrade procedures are well documented (e.g., using ONIE updater, vendor diagnostics, network operating software (NOS), etc.), customers or other end-users seek to avoid the hassle of integrating such upgrade procedures into their automation. Further, some non-sophisticated customers or other end-users may fail to correctly integrate such upgrade procedures into their automation.

Further technical challenges relate to the managed IT assets themselves, which may spend an (unpredictably) variable time in partner/depot facilities, such that the firmware of the IT assets may not be current when the IT assets are onboarded or zero touch provisioned (ZTP'd) in a customer or end user data center. The cost of upgrading components in second touch facilities may also be prohibitively expensive (e.g., potentially negative margin scenarios).

The concepts of Preboot Execution Environment (PXE) over wireless, configuration, control, and upgrade over a management wireless uplink, Firmware Over-the-Air (FOTA), etc., have been used for wireless access points (APs). These options, however, have been out of reach for certain types of IT assets such as network switches. With the rollout of enterprise 5G, as well as the adoption of WiFi 6, a solution that provides a multiplexed uplink to both management (e.g., ethernet) and console ports with a single device can conveniently address these and other technical challenges. Illustrative embodiments provide a WOOBM solution that utilizes a WOOBM device (also referred to as a dongle) that derives power from a managed IT asset (e.g., a network switch) and uplinks to the RAN (e.g., of a 5G or other cellular network), to WiFi access points, etc. In some embodiments, the WOOBM device derives power from one of the OOBM ports of the managed IT asset (e.g., the management port of the IT asset, where the management port comprises a power over ethernet (PoE) port). In other embodiments, the WOOBM device derives power from a non-OOBM port of the managed IT asset, such as a USB port that is distinct from OOBM ports of the managed IT asset.

In the description herein, connections between components or systems within the figures are not intended to be limited to direct connections unless otherwise specified. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

It should be appreciated that although certain embodiments are described herein within the context of certain connectors and ports, embodiments are not so limited. For example, while various embodiments are described with respect to console and management port RJ45 jacks, it should be understood that various other types of connectors or ports (e.g., universal serial bus (USB), micro-USB, etc.) may be used instead of or in addition to RJ45 jacks. The terms "managed switch port," and "management switch port" and "management port" are used interchangeably. Similarly, "PoE OOBM switch" and "OOBM switch" are used interchangeably. "OOBM switch port" refers to the port of an OOBM switch.

Figure 2:
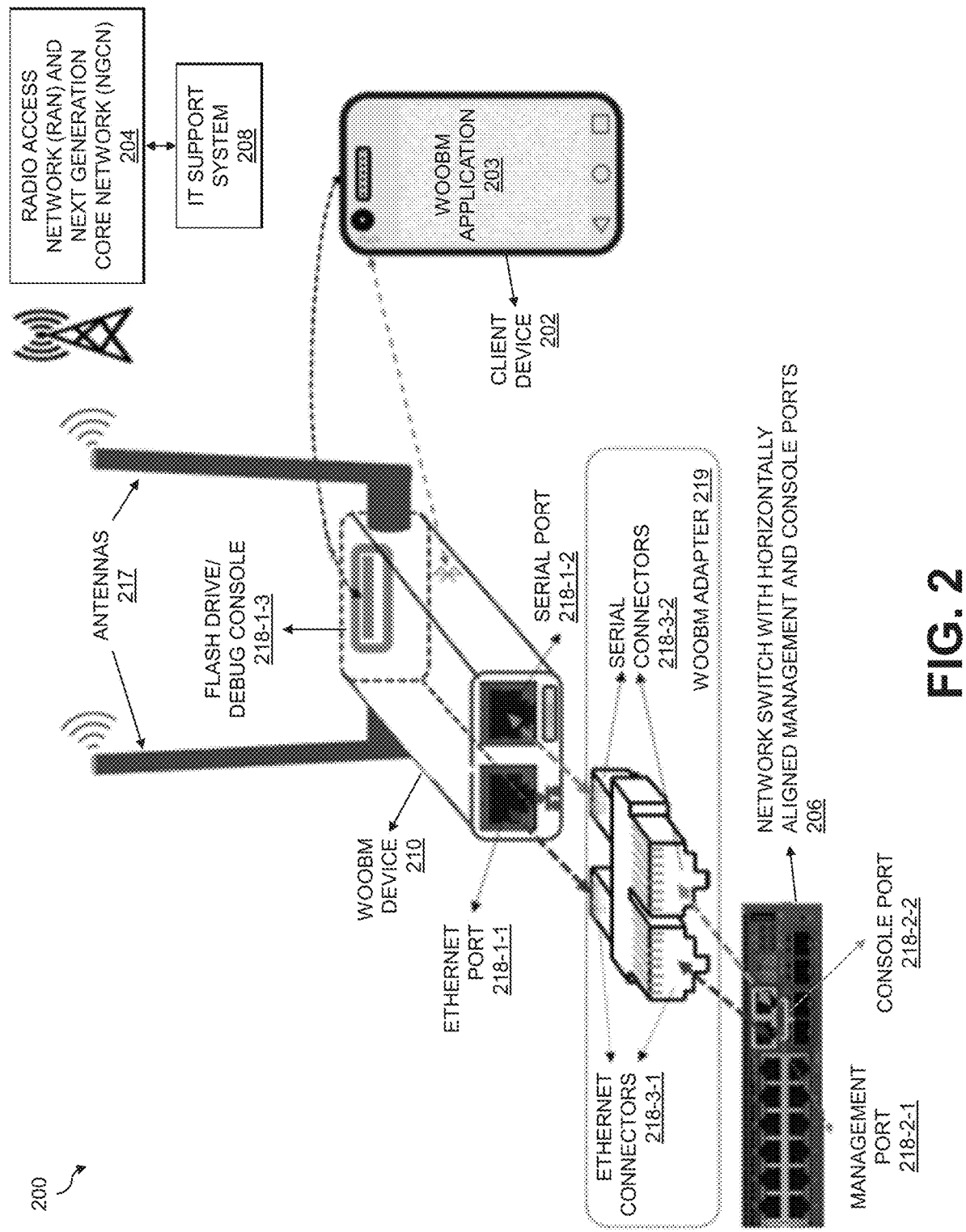
FIG. 2 shows an information processing system including a power over ethernet powered wireless out-of-band management device configured for connection to a network switch with horizontally aligned management and console ports in an illustrative embodiment.
Figure 3:
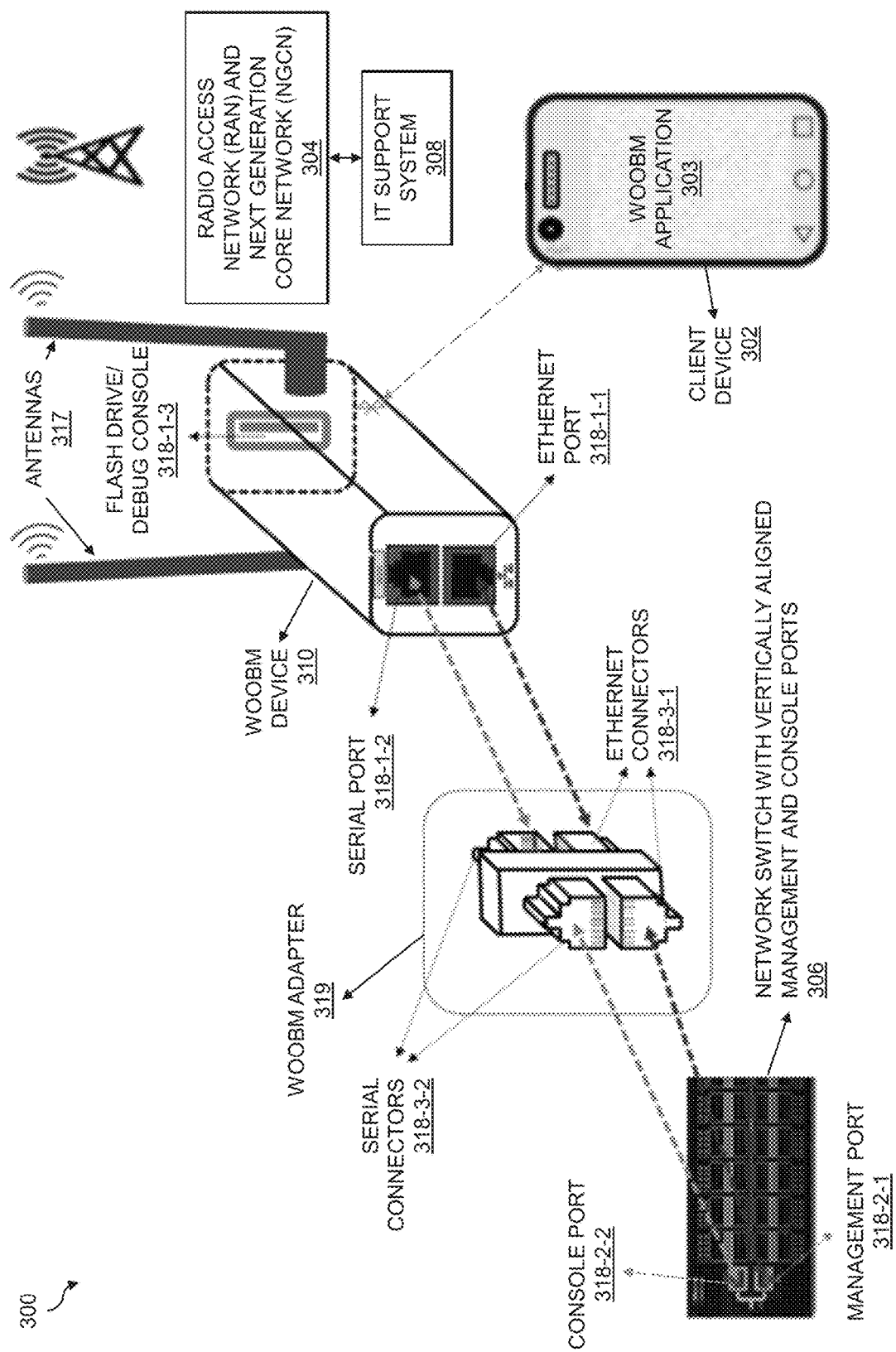
FIG. 3 shows an information processing system including a power over ethernet powered wireless out-of-band management device configured for connection to a network switch with vertically aligned management and console ports in an illustrative embodiment.
Figure 5:
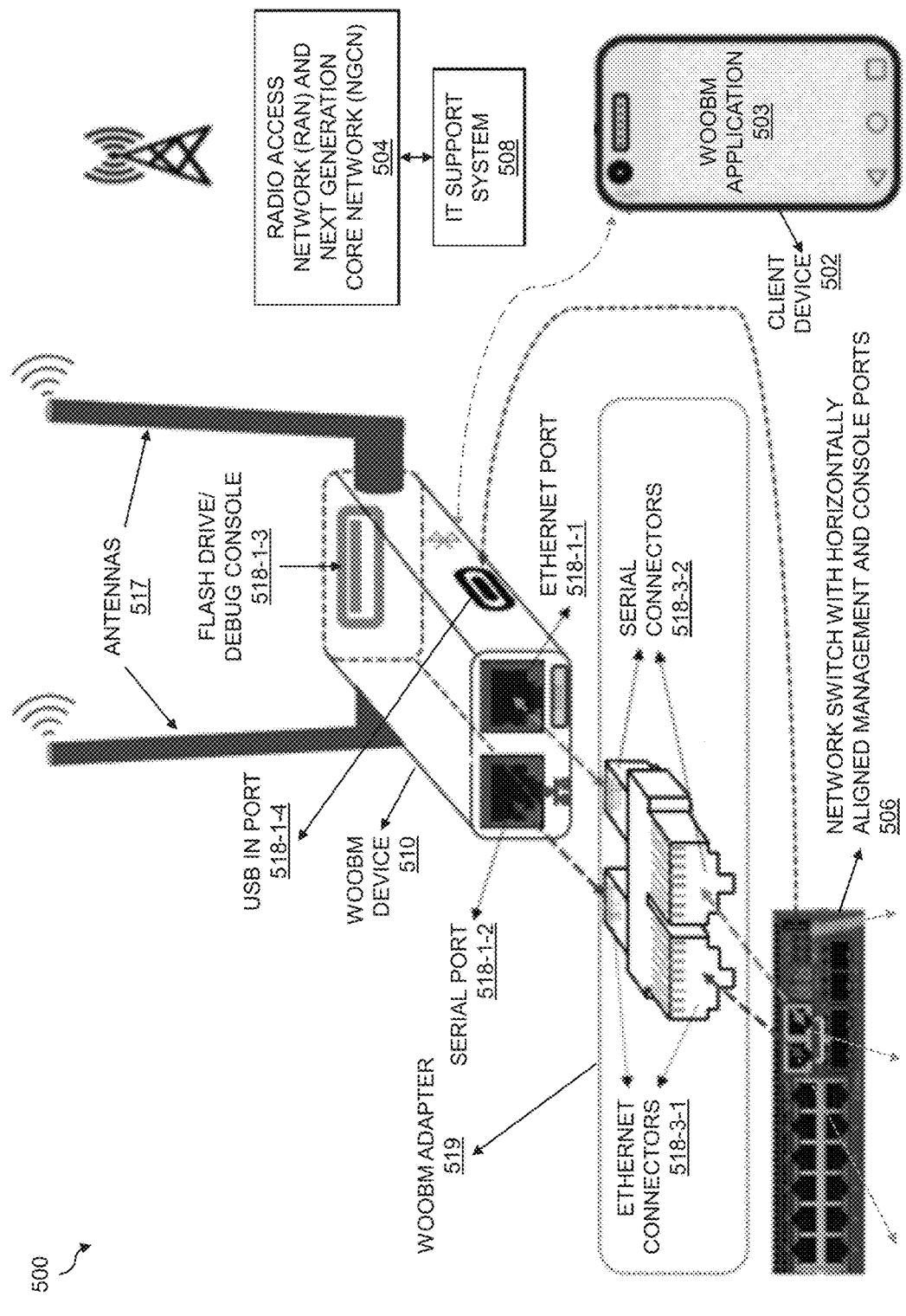
FIG. 5 shows an information processing system including a universal serial bus powered wireless out-of-band management device configured for connection to a network switch with horizontally aligned management, console and universal serial bus ports in an illustrative embodiment.
Figure 6:
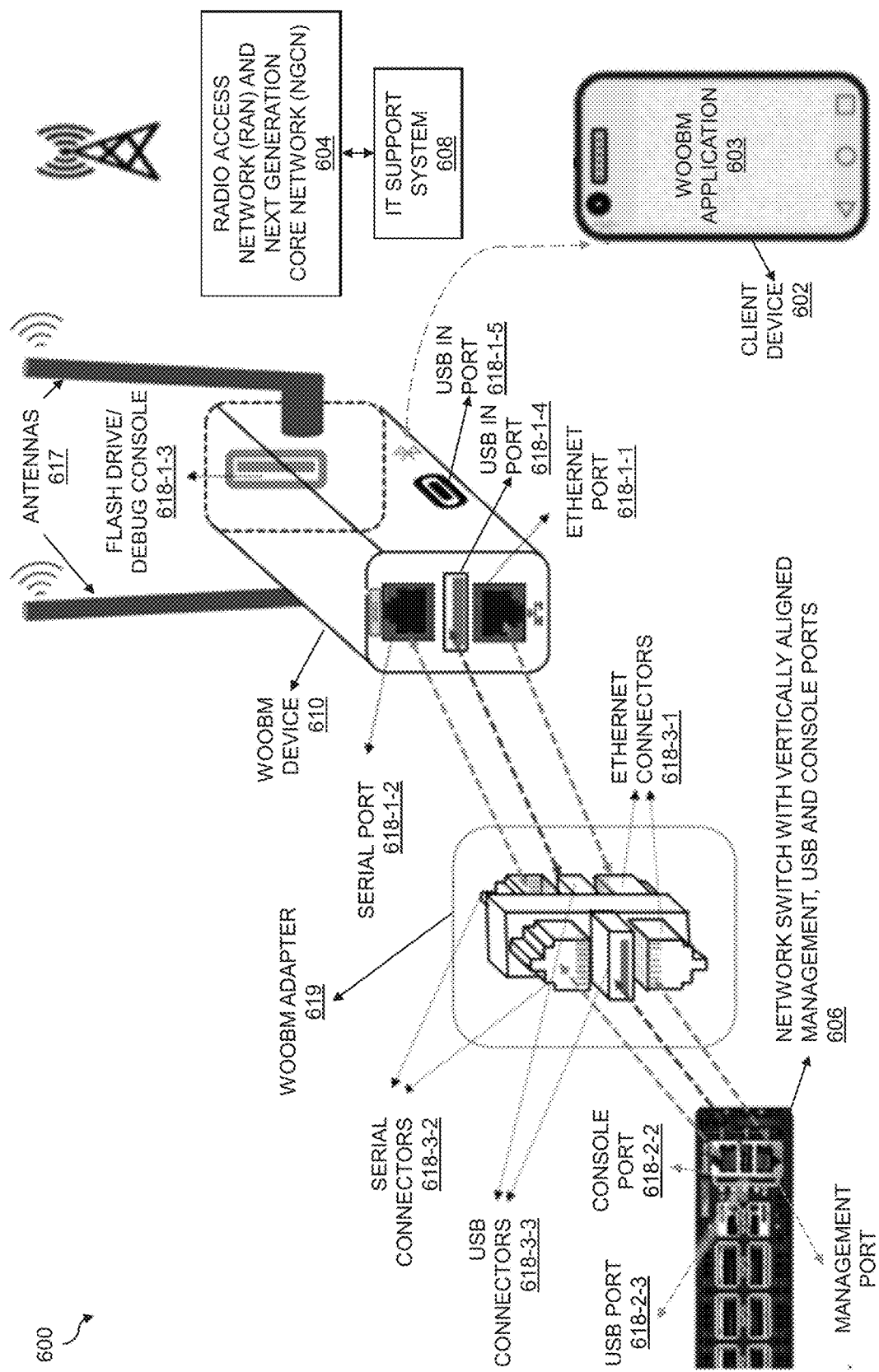
FIG. 6 shows an information processing system including a universal serial bus powered wireless out-of-band management device configured for connection to a network switch with vertically aligned management and console ports in an illustrative embodiment.

Vendors of IT assets, such as network switches, may provide OOBM ports (e.g., RJ45 ports) that are co-located—a console port and a management ethernet port (e.g., a 1G port). These OOBM ports may be aligned horizontally (e.g., as shown in FIGS. 2 and 5) or vertically (e.g., as shown in FIGS. 3 and 6). The management ethernet port on the network switch or other IT asset being managed may be made 802.1af PoE capable to power a WOOBM device or dongle that may be attached to the network switch or other IT asset being managed (e.g., possibly using a WOOBM connection port adapter).

FIG. 2 shows a system 200 including a WOOBM device 210 and matching WOOBM connection port adapter 219 that have horizontally aligned ports. The WOOBM device 210 is configured to provide connectivity between a network switch 206 with horizontally aligned OOBM ports, including a management ethernet port 218-2-1 and a console port 218-2-2. The WOOBM device 210 includes an ethernet port 218-1-1, a serial port 218-1-2, and a flash drive/debug console 218-1-3. The WOOBM device 210 includes adjustable antennas 217 which connect to an IT support system 208 over one or more wireless networks 204, shown in FIG. 2 as a radio access network (RAN) and next generation core network (NGCN) (e.g., of a private 5G enterprise core network, which may in turn have the ability to access secure remote services or support assistance services offered by that enterprise). The flash drive/debug console 218-1-3 may be used to debug software running on the WOOBM device 210. The flash drive/debug console 218-1-3 may use a 4-pin connector or any other desired type of debugging connection or mechanism.

The network switch 206, also referred to as a managed switch 206, comprises the management ethernet port 218-2-1, also referred to simple as management port 218-2-1, and a console port 218-2-2 that are co-located. The management port 218-2-1 is PoE capable to provide power to the WOOBM device 210. In the FIG. 2 example, the management port 218-2-1 and console port 218-2-2 are co-located on the managed switch 206 (e.g., next to other ports), which may be on the front or rear of the managed switch 206. The management port 218-2-1 and console port 218-2-2 may be connected to internal components (e.g., one or more application-specific integrated circuits (ASICs) or other processors, not shown) of the managed switch 206.

The WOOBM connection port adapter 219, also referred to as a WOOBM adapter 219, is an optional device that may be used to connect the WOOBM device 210 to the managed switch 206. The WOOBM adapter 219 may include sets of ethernet connectors 218-3-1 for connection to ethernet port 218-1-1 of the WOOBM device 210 and the management port 218-2-1 of the managed switch 206, as well as serial connectors 218-3-2 for connection to serial port 218-1-2 of the WOOBM device 210 and the console port 218-2-2 of the managed switch 206. In other embodiments, the management port 218-2-1 and ethernet port 218-1-1, as well as the serial port 218-1-2 and console port 218-2-2, may be connected without utilizing WOOBM adapter 219, such as using Ethernet and/or console cables. The WOOBM adapter 219, however, may be preferred in implementations in which the WOOBM device 210 has a certain length (e.g., greater than 3 inches (in)) and/or a considerable cross-section that may potentially obstruct air flow (e.g., when being suspended from a rack with no support, the WOOBM adapter 219 may be used to position the WOOBM device 210 in the management port 218-2-1 and console port 218-2-2 of the managed switch 206, preventing the WOOBM device 210 from negatively impacting cooling).

The distances between the ethernet connectors 218-3-1 and the serial connectors 218-3-2 (e.g., the distances between midpoints of the male connectors) that attach to the WOOBM device 210 and managed switch 206 may be fixed and substantially correspond to the distances between the jacks or ports 218-1-1 and 218-1-2 of the WOOBM device 210 and the jacks or ports 218-2-1 and 218-2-2 of the managed switch 206. In practice, the distances between the management and console ports of managed switches or other IT assets may vary (e.g., across different vendors, across different models or product lines from the same or different vendors, etc.). Accordingly, the distances between the ethernet connectors 218-3-1 and serial connectors 218-3-2 on both sides of the WOOBM adapter 219 may be customized to match the dimensions of corresponding ports on both the WOOBM device 210 and the managed switch 206. Assuming a user desires integrated management and console access for an IT asset (e.g., management switch 206) having horizontally-aligned management and console ports, the user may select a particular one of multiple WOOBM adapters (e.g., having different spacing between their ethernet and serial connectors) that matches that IT asset as well as the WOOBM device 210 used by that user. In some embodiments, the WOOBM adapter 219 and/or WOOBM device 210 may comprise unique identifiers such as stock keeping units (SKUs) that simplify matching of the WOOBM device 210 to the WOOBM adapter 219. It should be understood that many SKUs or other identifiers may exist for different combinations of WOOBM devices and mating WOOBM adapters.

In some embodiments, the ethernet connectors 218-3-1 and serial connectors 218-3-2 of the WOOBM adapter 219 are designed to extend into the WOOBM device 210 by a certain length to support the weight of the WOOBM device 210. Various other supporting structures may also or alternatively be used such that the WOOBM device 210 can be securely attached to a rack (not shown).

The WOOBM device 210 may be configured for communication with a client device 202 running a WOOBM application 203 (e.g., for use in controlling or access the WOOBM device 210 and/or the managed switch 206 that the WOOBM device 210 is connected to). The WOOBM application 203 may be used for debugging of the WOOBM device 210 (e.g., via flash drive/debug console 218-1-3, via a wireless network connection such as a Bluetooth or BLE connection).

The management and console ports of a managed switch or other IT asset may be aligned horizontally or vertically. If the management and console ports are aligned horizontally (e.g., along a common horizontal axis as shown in the managed switch 206 of FIG. 2), then the horizontally-aligned WOOBM device 210 and WOOBM adapter 219 may be used. If, however, the management and console ports are aligned vertically (e.g., along a common vertical axis as shown in the managed switch 306 of the system 300 of FIG. 3), then a vertically-aligned WOOBM device 310 and WOOBM adapter 319 may be used. The WOOBM device 310, similar to WOOBM device 210, includes an ethernet port 318-1-1, a serial port 318-1-2 and a flash drive/debug console 318-1-3, as well as antennas 317 for connecting with an IT support system 308 via RAN and NGCN 304. The managed switch 306, similar to managed switch 206, includes a management ethernet port 318-2-1 (e.g., a PoE port) and a console port 318-2-2. The management ethernet port 318-2-1, also referred to as management port 318-2-1, and console port 318-2-2 of the managed switch 306 are vertically aligned, as compared with the horizontally aligned management port 218-2-1 and console port 218-2-2 of the managed switch 206.

It should be noted that RJ45 ports are depicted in FIGS. 2 and 3 for purposes of illustration only. While RJ45 jacks or ports have become the de facto standard for network switches, various other types of ports or connectors may be used as desired for network switches and other types of IT assets. Further, while FIGS. 2 and 3 show examples of managed switches 206 and 306 with horizontally and vertically aligned management and console ports, respectively, various other arrangements of management and console ports may be used in other network switches and other types of IT assets (e.g., such as diagonally juxtaposed management and console ports, management and console ports which are separated by one or more other ports as described in further detail below with respect to FIGS. 5-7, etc.).

In operation, once the WOOBM device 210 or 310 is plugged into the managed switch 206 or 306 (e.g., via the WOOBM adapters 219, 319, or via cables coupling the management ports 218-2-1, 318-2-1 to the ethernet ports 218-1-1, 318-1-1 and the console ports 218-2-2, 318-2-2 to the serial ports 218-1-1, 318-1-2), the WOOBM device 210 or 310 can multiplex signals from the ethernet ports 218-1-1, 318-1-1 and the serial ports 218-1-2, 318-1-2 and provide the resulting multiplexed signals over wireless network interfaces (e.g., antennas 217, 317) to respective IT support systems 208, 308 (e.g., via RAN/NGCNs 204, 304).

In some embodiments, the serial ports 218-1-2, 318-1-2 and console ports 218-2-2, 318-2-2 may handle WOOBM traffic, such as using a relatively low speed serial protocol and command line interface (CLI) commands. A user (e.g., of client device 202, 302 or IT support system 208, 308) may utilize a serial RS232 connection to access the console ports 218-2-2, 318-2-2 (e.g., to access a BIOS of the managed switch 206, 306). The console ports 218-2-2, 318-2-2 may be coupled to a reverse telnet session (e.g., on IT support systems 208, 308, on client devices 202, 302, etc.) that may act as the console server. In some cases, the WOOBM devices 210, 310 themselves act as the console server for such reverse telnet sessions, as will be discussed in further detail below.

A user (e.g., of client device 202, 302 or IT support system 208, 308) may further use ethernet connectivity of the management ports 218-2-1, 318-2-1 (e.g., which may be 1G or 10G ports running an 802.3 Ethernet protocol and having an IP address that can be reached by using a telnet session) to facilitate queries, and use Simple Network Management Protocol (SNMP) or other network management protocols to remotely manage the managed switches 206, 306 using WOOBM. In some cases, the management ports 218-2-1, 318-2-1 are linked to a management switch in the IT support system 208, 308 and/or a management network within the IT support system 208, 308 or accessible via client devices 202, 302 using wireless network protocols. In some embodiments, console characters from multiplexed WOOBM traffic (e.g., provided from the WOOBM device 210, 310 over wireless networks using antennas 217, 317) may be demultiplexed, and a reverse telnet session may be established to the console ports 218-2-2, 318-2-2 through a management switch port of a management switch in the IT support system 208, 308.

The WOOBM devices 210, 310 may implement a bump-in-the-wire(less) design that consolidates management traffic (e.g., from management port 218-2-1, 318-2-1) and console server traffic (e.g., from console port 218-2-2, 318-2-2) into a single wireless uplink, by multiplexing traffic. This allows a user (e.g., of client device 202, 302 or IT support system 208, 308) to access both the management ports 218-2-1, 318-2-1 and console ports 218-2-2, 318-2-2 of the managed switches 206, 306 through a single WOOBM device 210, 310 (e.g., using reverse telnet) and without having to handle two different types of network connectivity. As a result, multiplexing different types of traffic facilitates the ease of configuration and control of the managed switches 206, 306.

In some embodiments, as discussed above, the management ports 218-2-1, 318-2-1 are assumed to be PoE capable, such that when the WOOBM device 210, 310 is connected thereto (e.g., using the WOOBM adapter 219, 319 or cables), the management ports 218-2-1, 318-2-1 act as power sourcing equipment (e.g., 802.1af PoE ports) and the WOOBM devices 210, 310 become powered devices. Advantageously, this eliminates the need to energize the WOOBM devices 210, 310 by using additional power lines that, in addition to increasing installation cost, may obstruct airflow. Reducing cabling and cable clutter by a significant amount further improves rack space use (e.g., in favor of providing increased computing space). It should be appreciated, however, that the WOOBM devices 210, 310 may be energized via other mechanisms, such as through separate USB connections (e.g., as described below with respective to FIGS. 5-7), though batteries or other power sources internal to the WOOBM devices 210, 310, through external power sources other than the managed switches 206, 306, etc.

The WOOBM devices 210, 310 enable the managed switches 206, 306 to be configured and/or controlled using a single network operating software (NOS)/touchpoint. This advantageously simplifies the configuration and management of both the management ports 218-2-1, 318-2-1 and console ports 218-2-2, 318-2-2 using the WOOBM devices 210, 310 as an integrated device. Further, the technical solutions enabled by the WOOBM devices 210, 310 are vendor-neutral, and agnostic to the NOS, BIOS, Open Network Install Environment (ONIE), Diagnostic Operating System (DIAG-OS) software capabilities, or other software running on the managed switches 206, 306 (or other IT assets being managed using a WOOBM device). The technical solutions enabled by the WOOBM devices 210, 310 are further agnostic to the processors or other hardware that may be embedded in the managed switches 206, 306 (or other IT assets being managed using a WOOBM device). Furthermore, the technical solutions described herein can significantly reduce power consumption and operating cost.

Figure 4:
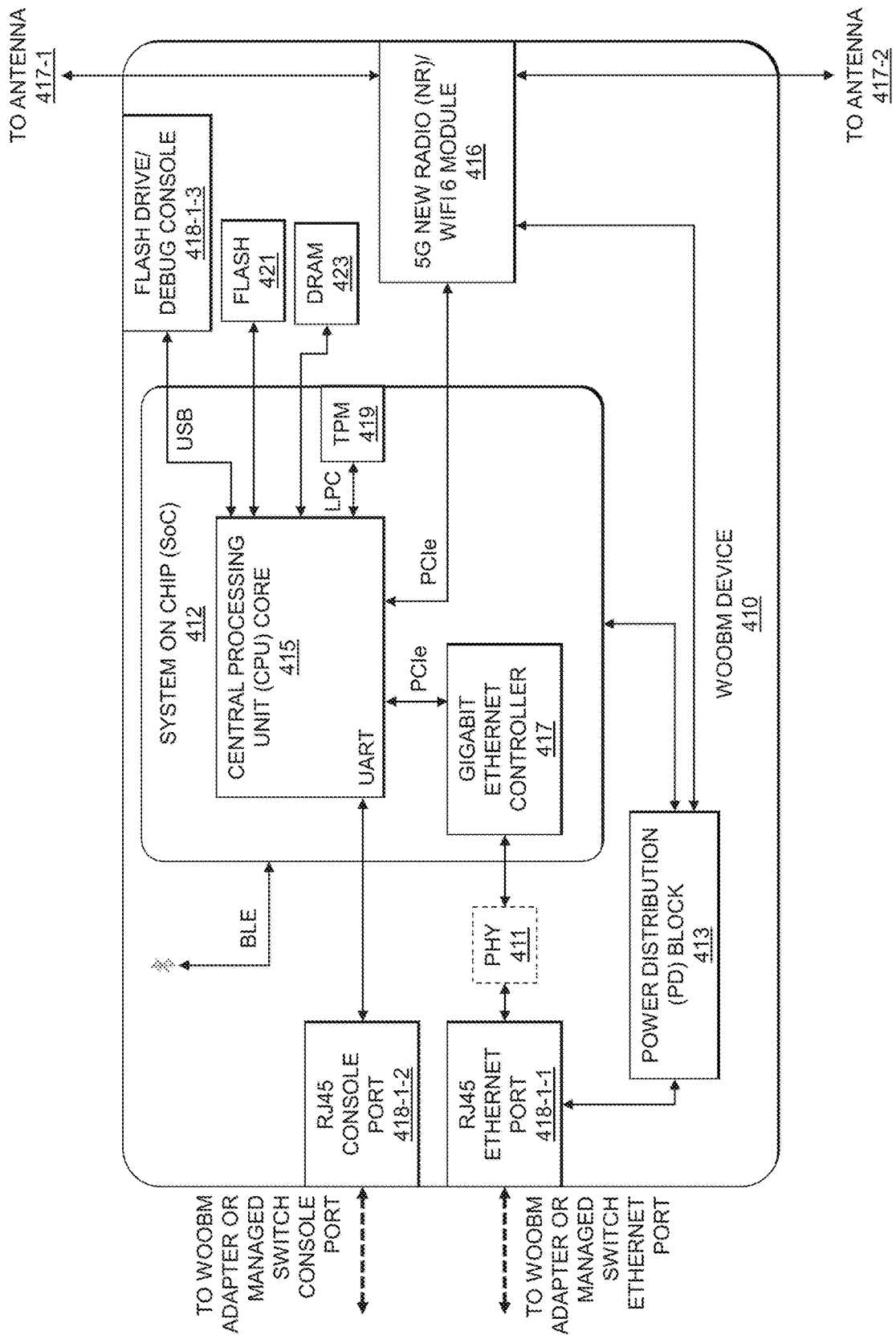
FIG. 4 shows functional blocks of a power over ethernet powered wireless out-of-band management device in an illustrative embodiment.

FIG. 4 shows a functional block diagram of a WOOBM device 410 (which may be the horizontally aligned WOOBM device 210 or the vertically aligned WOOBM device 310). The WOOBM device 410 comprises an ethernet port 418-1-1 and console port 418-1-2, both depicted as RJ45 ports, as well as a wireless network interface 416 coupled to antennas 417-1 and 417-2. In the FIG. 4 example, the wireless network interface 416 is depicted as a 5G New Radio (NR)/WiFi 6 module, though this is not a requirement.

The WOOBM device 410 further includes a System on Chip (SoC) 412 including a Central Processing Unit (CPU) core 415 and a gigabit ethernet controller 417 that is coupled to the ethernet port 418-1-1 via a physical layer circuit (PHY) 411. The CPU core 415 has a Peripheral Component Interconnect Express (PCIe) (e.g., 1 lane) link to the gigabit ethernet controller 417, as well as a PCIe (e.g., 1 lane) link to the wireless network interface 416. Here, the ethernet port 418-1-1 is assumed to be PoE capable, such that once the WOOBM device 410 is connected to a PoE port of an IT asset (e.g., managed switch 206, 306, possibly via WOOBM adapters 219, 319), the PoE port may energize the WOOBM device 410 and cause it to act as a class 1 powered device. This may be implemented through a power distribution (PD) block 413, which can provide suitable amounts of power to the SoC 412 and the wireless network interface 416. Although 1G/full-duplex has become the management port standard, a PHY (e.g., 411) may be used, for example, to adjust to sub-1 G speeds at the managed switch end or at the wireless network interface 416 end of the WOOBM device 410.

The gigabit ethernet controller 417 may be an integrated multiport device (e.g., a Media Access Control (MAC) switch) that has a first port (e.g., a managed interface port) that is internally managed by the SoC 412. From the perspective of the CPU core 415, the managed interface port may be a PCIe ethernet port that is used to configure the gigabit ethernet controller 417. The gigabit ethernet controller 417 may have an SDK/kernel driver that may be used to transmit and receive packets (e.g., ethernet frames) over such an internal interface. The CPU core 415 has a PCIe (e.g., 1 lane) link to the gigabit ethernet controller 417.

The gigabit ethernet controller 417 in some embodiments may detect ethernet packets that are destined for an IT support system (e.g., a management switch or other device in the IT support system). Another port of the gigabit ethernet controller 417 is coupled to the ethernet port 418-1-1. In some embodiments, the gigabit ethernet control 417 may be used to implement bump-in-the-wire management port throttling (e.g., in scenarios where a gigabit ethernet port of a switch does not support management port throttling to control the amount of ethernet traffic). The gigabit ethernet controller 417 may implement a rule to drop packets if the rate of untagged packets destined for the wireless network interface 416 exceeds some threshold (e.g., 1000 packets per second).

As shown in FIG. 4, the SoC 412 comprises a Universal Asynchronous Receiver/Transmitter (UART) port that is coupled to the console port 418-1-2. In some embodiments, the UART port may establish primary console communication using a management switch or other device in an IT support system, a client device, or the WOOBM device 410 itself, as the console server to terminate the reverse telnet console session and reformat/package console traffic into ethernet frames, and to inject the reformatted console traffic into a PCIe port coupled to the wireless network interface 416.

An additional UART or USB port may be used to establish debugging of the OS or other software of the WOOBM device 410 itself (e.g., using flash drive/debug console 418-1-3). In some embodiments, scripts that may execute on the WOOBM device 410 (e.g., CLI commands) can be downloaded and stored to the SoC 412 in addition to or in lieu of having access to an external server. The WOOBM device 410 may enable buffering to facilitate the capturing of console logs (e.g., in scenarios where connectivity has been temporarily lost, or where no reverse telnet session has been established yet since no users have connected to the console yet). The SoC 412 may further implement a Trusted Platform Module (TPM) 419 connected to the CPU core 415 via a low pin count (LPC) bus. The SoC 412 may be further coupled to flash memory 412 and/or dynamic random-access memory (DRAM) 423. In addition, the SoC 412 may implement Bluetooth or BLE radio functionality for establishing wireless network connections with, for example, client devices (e.g., client devices 202, 302). The Bluetooth or BLE radio functionality enables a user (e.g., of client devices 202, 302) to pair a smartphone application (e.g., WOOBM application 203, 303) using Bluetooth or BLE (or via a USB cable to flash drive/debug console 218-1-3, 318-1-3 or a separate USB port not shown) to configure the WOOBM device 410 if desired (e.g., to set a static IP address, preferred 5G or other wireless network, download files, update the WOOBM device 410 boot image, debug the WOOBM device 410, etc.).

In some embodiments, the ethernet port 418-1-1 and gigabit ethernet controller 417 may operate at hardware speed or line rate with no significant delay (e.g., when performing multiplexing operations). In software implementations, various functions (e.g., encapsulation, decapsulation, mapping, etc.) may take advantage of one or more hardware accelerators (not shown) which may be implemented within the CPU core 415.

Data traffic through the WOOBM device 410 will now be described. In some embodiments, management port traffic ingresses on the ethernet port 418-1-1 (e.g., from a managed switch or other IT asset, not shown). In operation, the management port traffic is received by the gigabit ethernet controller 417, and is then switched towards the CPU core 415 via the PCIe interface. The management port traffic may then be provided from the CPU core 415 to the wireless network interface 416 via another PCIe interface, possibly after various preprocessing by the CPU core 415. The CPU core 415 also receives console port traffic that ingresses on the console port 418-1-2 (e.g., from a managed switch or other IT asset, not shown). Such console port traffic may then be provided from the CPU core 415 to the wireless network interface 416 via the PCIe interface, possible after various preprocessing by the CPU core 415. The wireless network interface 416 provides such data traffic over one or more wireless networks using the antennas 417-1 and 417-2.

The antennas 417-1 and 417-2 may also receive data traffic that is destined for the WOOBM device 410 or an IT asset (e.g., a managed switch) that the WOOBM device 410 manages. Any received data traffic may be provided from the wireless network interface 416 to the CPU core 415, and then may be switched to the ethernet port 418-1-1 and/or console port 418-1-2 as needed.

Data traffic that is routed through the WOOBM device 410 may be switched via virtual local area networks (VLANs), which may be labeled as VLAN E (e.g., for management ethernet traffic to/from ethernet port 418-1-1) and VLAN C (e.g., for console traffic to/from console port 418-1-2). Incoming console traffic from the console port 418-1-2 may include console output data characters, which may be encapsulated by the CPU core 415 into VLAN-tagged packets or ethernet frames. It should be noted that such encapsulation or encoding may include any desired type or types of embedding, reformatting and packaging. The format of a serial output packet may comprise an ethernet header that (1) identifies the MAC address of a management switch or other device in an IT support system as the destination MAC address, (2) identifies the MAC address of the WOOBM device 410 as the source MAC address, and (3) tags the packet with a VLAN "C" tag to obtain a VLAN C packet. The VLAN C packets may be identified as console output and mapped to a reverse telnet console session (e.g., for access to the console of the IT asset or managed switch that the WOOBM device 410 is coupled to). Console and ethernet traffic (e.g., tagged with VLAN C and VLAN E, respectively), may be assigned different relative priority based on user preference.

Console input traffic flow (e.g., received at the wireless network interface 416 from an IT support system or client device) may include VLAN C tagged console packets that include serial input data characters that result from a user establishing a reverse telnet session and inputting via keystrokes at a CLI. The reverse telnet session may convert such characters to ethernet frames and feed the frames over one or more wireless networks (e.g., as VLAN C tagged console packets having the MAC address of the WOOBM device 412 as the destination MAC address). The CPU core 415 may decapsulate such ethernet frames to extract the characters and inject the decapsulated frames into the console port 418-1-2 via the UART port, such that the characters will eventually reach a console port of an IT asset (e.g., a managed switch) being managed by the WOOBM device 410). It should be noted that the VLAN "E" and "C" tags may be hardcoded or assigned using various link discovery protocols.

An initialization sequence for the WOOBM device 410 will now be described. Once the SoC 412 is energized and boots up, it may perform the initialization sequence which includes initializing UART, gigabit ethernet and wireless network interface (e.g., 5G/WiFi 6) drivers. The SoC 412 starts a DHCP client on the wireless network interface 416 (e.g., a wireless port thereof) and receives one or more IP addresses from a DHCP service (e.g., an Evolved Packet Core (EPC)) which are assigned to the WOOBM device 410 itself. The SoC 412 also starts a telnet or secure shell (SSH) service, which enables telnet or SSH connections to be established to an OS running on the WOOBM device 410 (e.g., to facilitate management and/or debugging operations, if desired). The SoC 412 may start a DHCP relay agent, so that the IP stack of the IT asset (e.g., the network switch) being managed can get one or more IP addresses assigned.

For ethernet traffic handling, in some embodiments only packets with the IP address of the WOOBM device 410 set as the destination address are lifted by the WOOBM's IP stack—other packets are bridged between the wireless network interface 416 and the ethernet port 418-1-1 of the WOOBM device 410. For console traffic handling, a reverse telnet session is started on the WOOBM device 410's IP address, with console traffic being bridged between the reverse telnet session and the UART port.

In some cases, it may not be possible to provide or enable PoE for the management port of a WOOBM device. In these and other cases, an alternative design for the WOOBM device may be implemented which utilizes USB power where it is possible to do so. FIG. 5 shows a system 500 including a WOOBM device 510 with an ethernet port 518-1-1 and serial port 518-1-2 which are horizontally aligned, for use with a network switch 506 (also referred to as managed switch 506) with a management ethernet port 518-2-1 (also referred to as management port 518-2-1_ and console port 518-2-2 that are horizontally aligned. Here, an optional WOOBM connection port adapter 519 (also referred to as WOOBM adapter 519) is shown, which also has horizontally aligned ethernet connectors 518-3-1 and serial connectors 518-3-2 for coupling the WOOBM device 510 to the managed switch 506 in a manner similar to that described above with respect to FIG. 2. The WOOBM device 510 also includes a flash drive/debug console 518-1-3, as well as antennas 517 for connecting with an IT support system 508 via RAN and NGCN 504 similar to the WOOBM device 210 of FIG. 2. The WOOBM device 510 further includes a USB in port 518-1-4, which is configured for coupling with a USB cable to a USB port 518-2-3 of the managed switch 506 for USB powering of the WOOBM device 510. Here, a USB cable is used since an adapter-based solution may not be possible as the USB port 518-2-3 of the managed switch 506 is not collocated with the OOBM ports (e.g., management port 518-2-1 and console port 518-2-2) due to the intervening stacking and system light-emitting diode (LED) indicators on the managed switch 506. If the USB port 518-2-3 were collocated with the OOBM ports on the managed switch 506, however, a WOOBM adapter 519 with integrated USB connectors may be used. An example of such an arrangement is shown in FIG. 6.

FIG. 6 shows a system 600 including a WOOBM device 610 with an ethernet port 618-1-1 and serial port 618-1-2 which are vertically aligned, for use with a network switch 606 (also referred to as managed switch 606) with a management ethernet port 618-2-1 (also referred to as management port 618-2-1) and console port 618-2-2 that are vertically aligned. Here, an optional WOOBM connection port adapter 619 (also referred to as WOOBM adapter 619) is shown, which also has vertically aligned ethernet connectors 618-3-1 and serial connectors 618-3-2 for coupling the WOOBM device 610 to the managed switch 606 in a manner similar to that described above with respect to FIG. 3. The WOOBM device 610 also includes a flash drive/debug console 618-1-3, as well as antennas 617 for connecting with an IT support system 608 via RAN and NGCN 604 similar to the WOOBM device 310 of FIG. 3. The WOOBM device 610 further includes a USB in port 618-1-4, which is configured for coupling via USB connectors 618-3-3 on the WOOBM adapter 619 to a USB port 618-2-3 of the managed switch 606 for USB powering of the WOOBM device 610. Here, the adapter-based solution is possible as the USB port 618-2-3 of the managed switch 606 is collocated with the OOBM ports (e.g., management port 618-2-1 and console port 618-2-2). The WOOBM device 610 also includes another optional USB in port 618-1-5 which may be used in a manner similar to that of the USB in port 518-1-4 for coupling with a USB cable.

Figure 7:
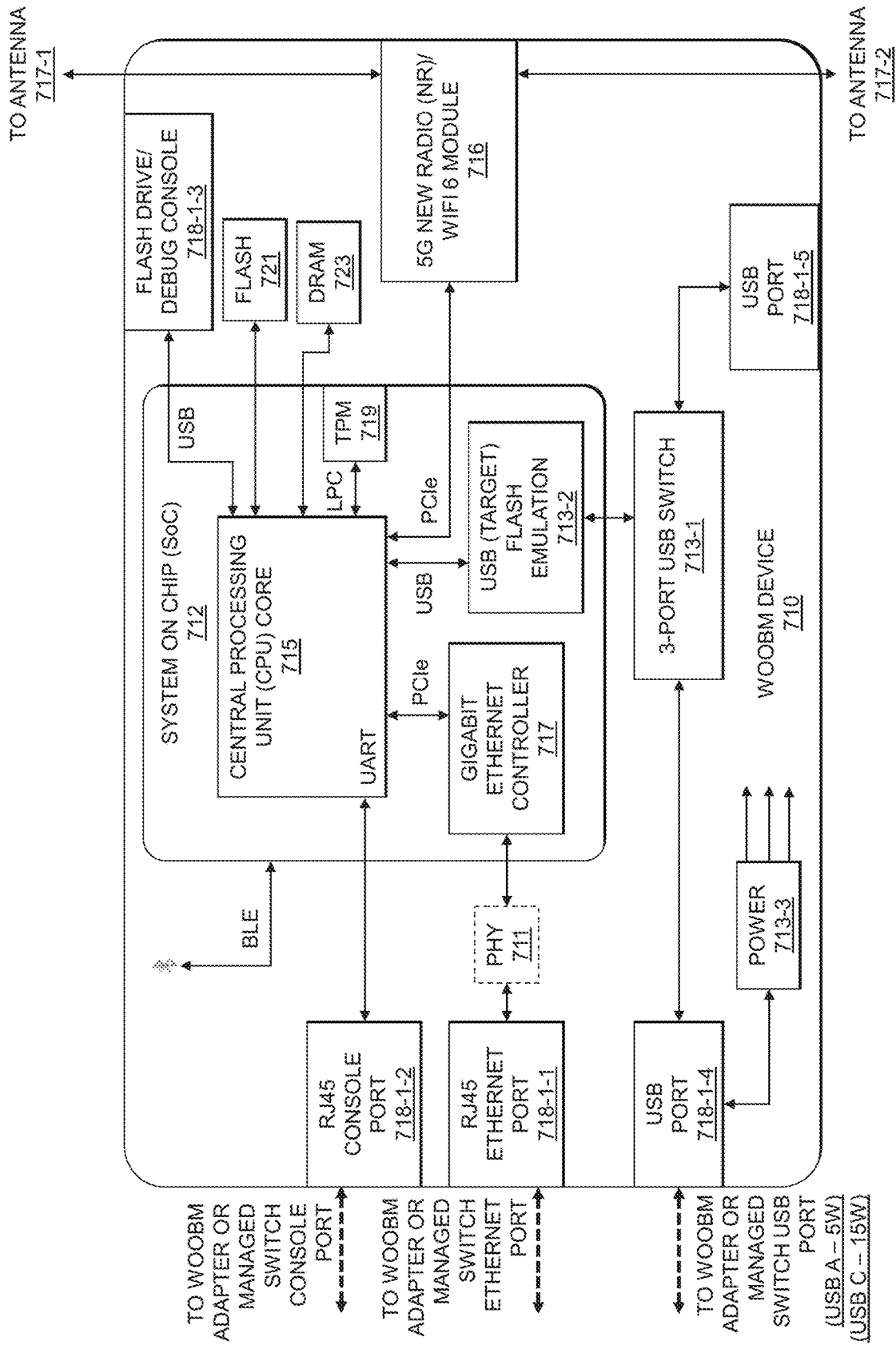
FIG. 7 shows functional blocks of a universal serial bus powered wireless out-of-band management device in an illustrative embodiment.

FIG. 7 shows a functional block diagram of a WOOBM device 710 (which may be the horizontally aligned WOOBM device 510 or the vertically aligned WOOBM device 610 that is USB powered). The WOOBM device 710 comprises an ethernet port 718-1-1 and console port 418-1-2, both depicted as RJ45 ports, as well as USB ports 718-1-4 and 718-1-5 and a wireless network interface 716 coupled to antennas 717-1 and 717-2. In the FIG. 7 example, the wireless network interface 716 is depicted as a 5G NR/WiFi 6 module, though this is not a requirement. The WOOBM device 710 further includes a SoC 712 including a CPU core 715 and a gigabit ethernet controller 717 that is coupled to the ethernet port 718-1-1 via PHY 711. The CPU core 715 has a PCIe (e.g., 1 lane) link to the gigabit ethernet controller 717, as well as a PCIe (e.g., 1 lane) link to the wireless network interface 716.

Here, the ethernet port 718-1-1 is assumed to not be PoE capable, such that the WOOBM device 710 is USB powered via a connection at the USB port 718-1-4 (or possibly the USB port 718-1-5) once the WOOBM device 710 is connected to a USB port of an IT asset (e.g., managed switch 506, 606). The USB power (which may be 5 watts (W) for USB type-A or 15 W for USB type-C), may energize the WOOBM device 710 and cause it to act as a class 1 powered device. This may be implemented through a 3-port USB switch 713-1, USB (target) flash emulation 713-2 in the SoC 712, and power block 713-3.

The gigabit ethernet controller 717 may be an integrated multiport device (e.g., a MAC switch) that has a first port (e.g., a managed interface port) that is internally managed by the SoC 712. From the perspective of the CPU core 715, the managed interface port may be a PCIe ethernet port that is used to configure the gigabit ethernet controller 717. The gigabit ethernet controller 717 may have an SDK/kernel driver that may be used to transmit and receive packets (e.g., ethernet frames) over such an internal interface. The CPU core 715 has a PCIe (e.g., 1 lane) link to the gigabit ethernet controller 717.

The gigabit ethernet controller 717 in some embodiments may detect ethernet packets that are destined for an IT support system (e.g., a management switch or other device in the IT support system). Another port of the gigabit ethernet controller 717 is coupled to the ethernet port 718-1-1. In some embodiments, the gigabit ethernet control 717 may be used to implement bump-in-the-wire management port throttling (e.g., in scenarios where a gigabit ethernet port of a switch does not support management port throttling to control the amount of ethernet traffic). The gigabit ethernet controller 717 may implement a rule to drop packets if the rate of untagged packets destined for the wireless network interface 716 exceeds some threshold (e.g., 1000 packets per second).

As shown in FIG. 7, the SoC 712 comprises a UART port that is coupled to the console port 718-1-2. In some embodiments, the UART port may establish primary console communication using a management switch or other device in an IT support system, a client device, or the WOOBM device 710 itself, as the console server to terminate the reverse telnet console session and reformat/package console traffic into ethernet frames, and to inject the reformatted console traffic into a PCIe port coupled to the wireless network interface 716.

An additional UART or USB port may be used to establish debugging of the OS or other software of the WOOBM device 710 itself (e.g., using flash drive/debug console 718-1-3). In some embodiments, scripts that may execute on the WOOBM device 710 (e.g., CLI commands) can be downloaded and stored to the SoC 712 in addition to or in lieu of having access to an external server. The WOOBM device 710 may enable buffering to facilitate the capturing of console logs (e.g., in scenarios where connectivity has been temporarily lost, or where no reverse telnet session has been established yet since no users have connected to the console yet). The SoC 712 may further implement a TPM 719 connected to the CPU core 715 via an LPC bus. The SoC 712 may be further coupled to flash memory 721 and/or DRAM 723. In addition, the SoC 712 may implement Bluetooth or BLE radio functionality for establishing wireless network connections with, for example, client devices. The Bluetooth or BLE radio functionality enables a user to pair a smartphone application using Bluetooth or BLE (or via a USB cable to flash drive/debug console 518-1-3, 618-1-3) to configure the WOOBM device 710 if desired (e.g., to set a static IP address, preferred 5G or other wireless network, download files, update the WOOBM device 710 boot image, debug the WOOBM device 710, etc.).

In some embodiments, the ethernet port 718-1-1 and gigabit ethernet controller 717 may operate at hardware speed or line rate with no significant delay (e.g., when performing multiplexing operations). In software implementations, various functions (e.g., encapsulation, decapsulation, mapping, etc.) may take advantage of one or more hardware accelerators (not shown) which may be implemented within the CPU core 715.

Data traffic through the WOOBM device 710 will now be described. In some embodiments, management port traffic ingresses on the ethernet port 718-1-1 (e.g., from a managed switch or other IT asset, not shown). In operation, the management port traffic is received by the gigabit ethernet controller 717, and is then switched towards the CPU core 715 via the PCIe interface. The management port traffic may then be provided from the CPU core 715 to the wireless network interface 716 via another PCIe interface, possibly after various preprocessing by the CPU core 715. The CPU core 715 also receives console port traffic that ingresses on the console port 718-1-2 (e.g., from a managed switch or other IT asset, not shown). Such console port traffic may then be provided from the CPU core 715 to the wireless network interface 716 via the PCIe interface, possible after various preprocessing by the CPU core. The wireless network interface 716 provides such data traffic over one or more wireless networks using the antennas 717-1 and 717-2.

The antennas 717-1 and 717-2 may also receive data traffic that is destined for the WOOBM device 710 or an IT asset (e.g., a managed switch) that the WOOBM device 710 manages. Any received data traffic may be provided from the wireless network interface 716 to the CPU core 715, and then may be switched to the ethernet port 718-1-1 and/or console port 718-1-2 as needed.

Data traffic that is routed through the WOOBM device 710 may be switched via VLANs, which may be labeled as VLAN E (e.g., for ethernet traffic to/from ethernet port 718-1-1) and VLAN C (e.g., for console traffic to/from console port 718-1-2). Incoming console traffic from the console port 718-1-2 may include console output data characters, which may be encapsulated by the CPU core 715 into VLAN-tagged packets or ethernet frames. It should be noted that such encapsulation or encoding may include any desired type or types of embedding, reformatting and packaging. The format of a serial output packet may comprise an ethernet header that (1) identifies the MAC address of a management switch or other device in an IT support system as the destination MAC address, (2) identifies the MAC address of the WOOBM device 710 as the source MAC address, and (3) tags the packet with a VLAN "C" tag to obtain a VLAN C packet. The VLAN C packets may be identified as console output and mapped to a reverse telnet console session (e.g., for access the console of the IT asset or managed switch that the WOOBM device 710 is coupled to). Console and ethernet traffic (e.g., tagged with VLAN C and VLAN E, respectively), may be assigned different relative priority based on user preference.

Console input traffic flow (e.g., received at the wireless network interface 716 from an IT support system or client device) may include VLAN C tagged console packets that include serial input data characters that result from a user establishing a reverse telnet session and inputting via keystrokes at a CLI. The reverse telnet session may convert such characters to ethernet frames and feed the frames over one or more wireless networks (e.g., as VLAN C tagged console packets having the MAC address of the WOOBM device 412 as the destination MAC address). The CPU core 715 may decapsulate such ethernet frames to extract the characters and inject the decapsulated frames into the console port 718-1-2 via the UART port, such that the characters will eventually reach a console port of an IT asset (e.g., a managed switch) being managed by the WOOBM device 710). It should be noted that the VLAN "E" and "C" tags may be hardcoded or assigned using various link discovery protocols.

An initialization sequence for the WOOBM device 710 will now be described. Once the SoC 712 is energized and boots up, it may perform the initialization sequence which includes initializing UART, gigabit ethernet and wireless network interface (e.g., 5G/WiFi 6) drivers. The SoC 712 starts a DHCP client on the wireless network interface 716 (e.g., a wireless port thereof) and receives one or more IP addresses from a DHCP service (e.g., an EPC) which are assigned to the WOOBM device 710 itself. The SoC 712 also starts a telnet or SSH service, which enables telnet or SSH connections to be established to an OS running on the WOOBM device 710 (e.g., to facilitate management and/or debugging operations, if desired). The SoC 712 may start a DHCP relay agent, so that the IP stack of the IT asset (e.g., the network switch) being managed can get one or more IP addresses assigned.

For ethernet traffic handling, only packets with the IP address of the WOOBM device 710 set as the destination address are lifted by the WOOBM's IP stack—other packets are bridged between the wireless network interface 716 and the ethernet port 718-1-1 of the WOOBM device 710. For console traffic handling, a reverse telnet session is started on the WOOBM device 710's IP address, with console traffic being bridged between the reverse telnet session and the UART port.

An exemplary process for WOOBM of IT assets will now be described in more detail with reference to the flow diagram of FIG. 8. It is to be understood that this particular process is only an example, and that additional or alternative processes for WOOBM of IT assets may be used in other embodiments.

In this embodiment, the process includes steps 800 through 804. These steps are assumed to be performed by the WOOBM device 110 utilizing the OOBM traffic management logic 120. The process begins with step 800, receiving, utilizing a first one of the connection ports 118-1, a first type of OOBM traffic from managed IT asset 106. In step 802, a second type of OOBM traffic from the managed IT asset 106 is received utilizing a second one of the connection ports 118-1. The first connection port may comprise a serial port, and the first type of OOBM traffic may comprise console traffic from the managed IT asset 106. The second connection port may comprise an ethernet port, and the second type of OOBM traffic may comprise ethernet traffic from the managed IT asset 106. The managed IT asset 106 may comprise a network switch. In some embodiments, the WOOBM device 110 receives power at the ethernet port from a PoE port of the managed IT asset 106. In other embodiments, the WOOBM device 110 receives power at a third one of the connection ports 118-1 from the managed IT asset 106. The third connection port may comprise a USB port. In some embodiments, a connection port adapter (e.g., WOOBM connection port adapter 119) may be used to couple the first and second connection ports to corresponding connection ports 118-2 of the managed IT asset 106.

The WOOBM device 110 in step 804 communicates, via the wireless network interfaces 116, the first and second types of OOBM traffic to one or more additional processing devices (e.g., client device 102, IT support system 108). In some embodiments, step 804 may comprise multiplexing the first and second types of OOBM traffic into one or more ethernet packets, and communicating the one or more ethernet packets comprising the multiplexed OOBM traffic. The at least one wireless network interface may utilize a cellular wireless network for communicating the first and second types of OOBM traffic to at least one of the one or more additional processing devices. The cellular wireless network may comprise a private 5G network of an enterprise providing support services for the managed IT asset 106 utilizing said at least one of the one or more additional processing devices. The at least one wireless network interface may also or alternatively utilize a WiFi wireless network for communicating the first and second types of OOBM traffic to at least one of the one or more additional processing devices. The at least one wireless network interface may also or alternatively utilize at least one of a Bluetooth and a BLE network for communicating the first and second types of OOBM traffic to at least one of the one or more additional processing devices. At least one of the one or more additional processing devices may be part of a cloud-based IT support system (e.g., IT support system 108) responsible for providing support services for the managed IT asset 106.

Figure 8:
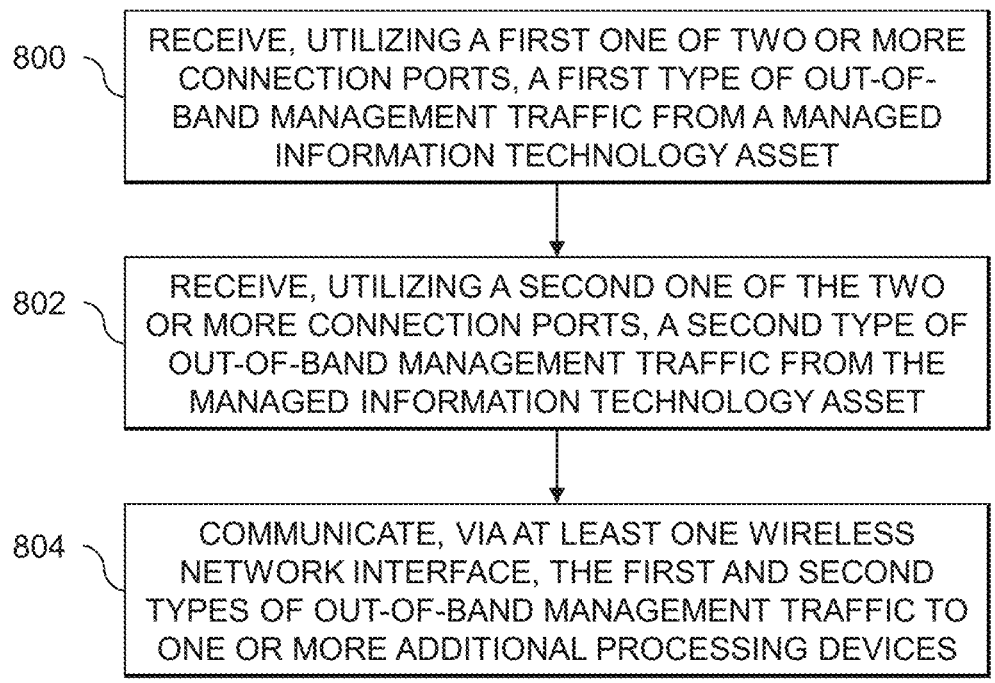
FIG. 8 is a flow diagram of an exemplary process for wireless out-of-band management of information technology assets in an illustrative embodiment.

In some embodiments, the FIG. 8 process may further include receiving, via the wireless network interfaces 116, additional OOBM traffic from at least one of the one or more additional processing devices and separating the additional OOBM traffic into the first type of OOBM traffic and the second type of OOBM traffic. The first type of OOBM traffic in the additional OOBM traffic is communicated utilizing the first connection port to a first one of the OOBM connection ports 118-2 of the managed IT asset 106, and the second type of OOBM traffic in the additional OOBM traffic is communicated utilizing the second connection port to a second one of the OOBM connection ports 118-2 of the managed IT asset 106.

The technical solutions described herein provide WOOBM devices or dongles (e.g., vertically or horizontally aligned) that are configured for connection to management and console ports of an IT asset being managed (e.g., a managed network switch), possibly with the use of WOOBM adapters, to multiplex management and console traffic from the IT asset being managed over one or more wireless networks (e.g., cellular networks such as LTE or 5G networks, WiFi networks, etc.). The technical solutions described herein thus advantageously enable ease of configuration and control of the IT asset being managed, reduced cabling, and WOOBM-based value added services (e.g., where a network operator or other user with a smartphone or other type of client device may interact with the WOOBM devices using Bluetooth or another suitable wireless communication protocol). Conventional WiFi or LTE-based USB adapters do not address the use case for networking switches and other types of IT assets where console and management (e.g., ethernet) traffic is multiplexed over a wireless interface. Further, conventional approaches do not enable access to multiple OOBM ports (e.g., management/ethernet and console ports) of an IT asset with a single wireless interface.

The WOOBM devices described herein may be used for various telecommunications, multi-cloud, enterprise and edge solutions where IT assets (e.g., network switches) are deployed at 5G cell sites, as well as enterprises that are deploying private 5G. The WOOBM devices described herein may be built, tested and eventually bundled with the IT assets they are designed to manage (e.g., for customers or other end-users who are planning to migrate management networks to LTE/5G or WiFi 6). Wireless wide area network (WWAN) vendors may also use WOOBM devices described herein. As described above, the WOOBM devices may be configured for powering via PoE (e.g., for IT assets such as network switches whose management ports are PoE-capable) or via USB (e.g., for IT assets such as network switches whose management ports are not PoE-capable).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for WOOBM of IT assets will now be described in greater detail with reference to FIGS. 9 and 10. Although described in the context of system 100, these platforms may also be used to implement at least portions of other information processing systems in other embodiments.

Figure 9:
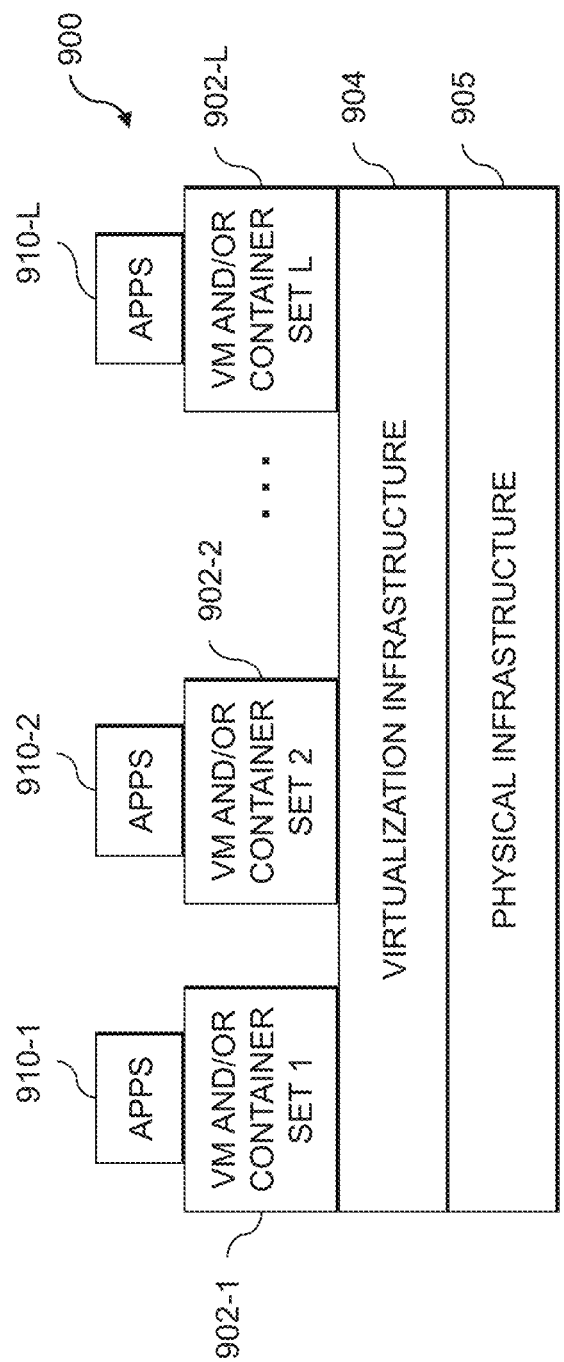
FIGS. 9 and 10 show examples of processing platforms that may be utilized to implement at least a portion of an information processing system in illustrative embodiments.
Figure 10:
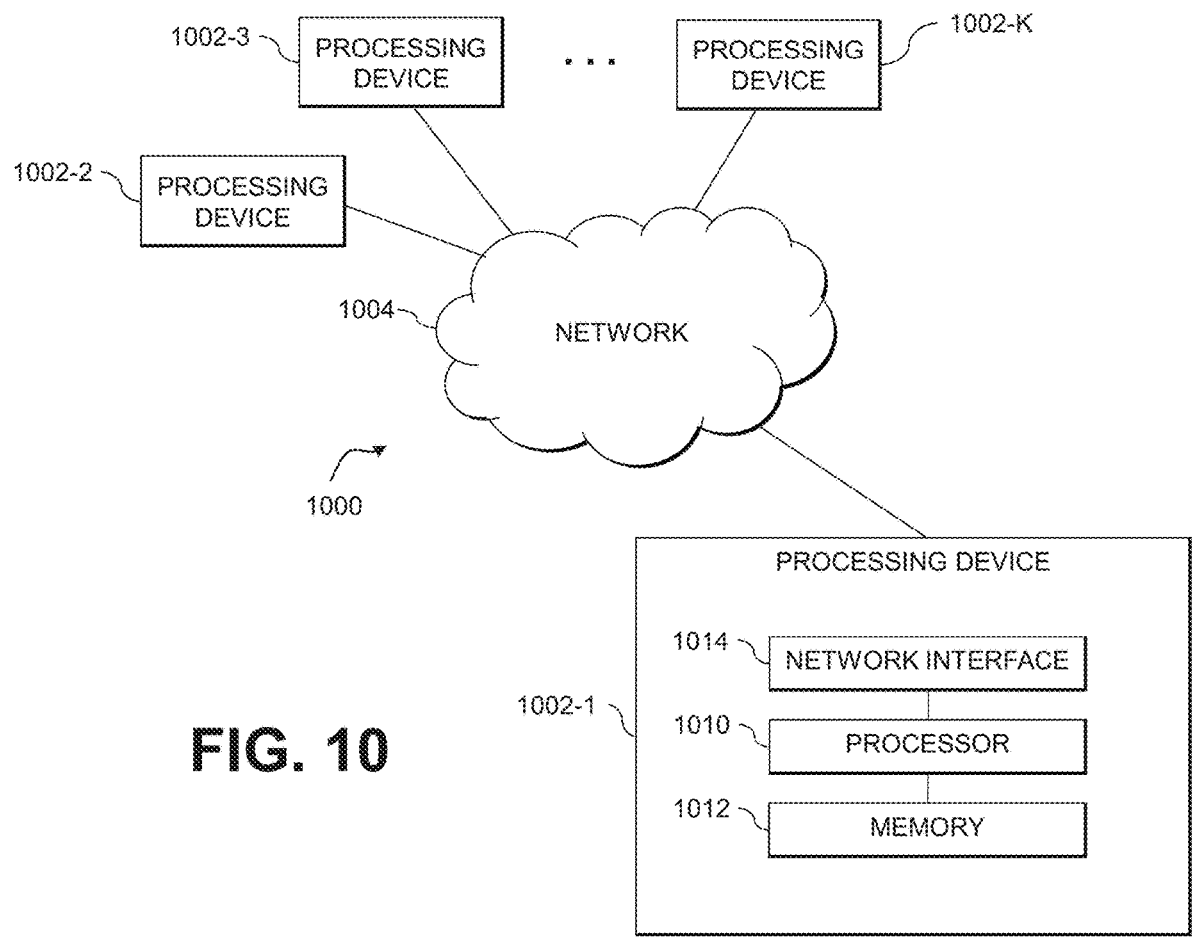

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for WOOBM of IT assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
two or more connection ports;
at least one wireless network interface; and
at least one processing device comprising a processor coupled to a memory;
the at least one processing device being configured:
to receive, utilizing a first one of the two or more connection ports, a first type of out-of-band management traffic from a managed information technology asset;
to receive, utilizing a second one of the two or more connection ports, a second type of out-of-band management traffic from the managed information technology asset;
to communicate, via the at least one wireless network interface, the first and second types of out-of-band management traffic to one or more additional processing devices;
to receive, via the at least one wireless network interface, additional out-of-band management traffic from at least one of the one or more additional processing devices;
to determine whether the additional out-of-band management traffic includes any out-of-band management traffic of the first and second types of out-of-band management traffic;
responsive to determining that at least a first portion of the additional out-of-band management traffic includes the first type of out-of-band management traffic, to communicate the first portion of the additional out-of-band management traffic to the managed information technology asset utilizing the first connection port; and
responsive to determining that at least a second portion of the additional out-of-band management traffic includes the second type of out-of-band management traffic, to communicate the second portion of the additional out-of-band management traffic to the managed information technology asset utilizing the second connection port.

2. The apparatus of claim 1 wherein the first connection port comprises a serial port and the first type of out-of-band management traffic comprises console traffic from the managed information technology asset.

3. The apparatus of claim 2 wherein the second connection port comprises an ethernet port and the second type of out-of-band management traffic comprises ethernet traffic from the managed information technology asset.

4. The apparatus of claim 1 wherein the managed information technology asset comprises a network switch.

5. The apparatus of claim 1 wherein the at least one processing device is further configured to receive power via at least one of the first connection port and the second connection port, said at least one of the first connection port and the second connection port comprising a power over ethernet port of the managed information technology asset.

6. The apparatus of claim 1 wherein the at least one processing device is further configured to receive power at a third one of the two or more connection ports from the managed information technology asset.

7. The apparatus of claim 6 wherein the third connection port comprises a universal serial bus port.

8. The apparatus of claim 1 wherein the at least one processing device is further configured to multiplex the first and second types of out-of-band management traffic into one or more ethernet packets, and wherein communicating the first and second types of out-of-band management traffic to the one or more additional processing devices comprises communicating the one or more ethernet packets comprising the multiplexed out-of-band management traffic.

9. The apparatus of claim 1 wherein the at least one wireless network interface utilizes a cellular wireless network for communicating the first and second types of out-of-band management traffic to at least one of the one or more additional processing devices.

10. The apparatus of claim 9 wherein the cellular wireless network comprises a private 5G network of an enterprise providing support services for the managed information technology asset utilizing said at least one of the one or more additional processing devices.

11. The apparatus of claim 1 wherein the at least one wireless network interface utilizes a WiFi wireless network for communicating the first and second types of out-of-band management traffic to at least one of the one or more additional processing devices.

12. The apparatus of claim 1 wherein the at least one wireless network interface utilizes at least one of a Bluetooth and a Bluetooth low energy network for communicating the first and second types of out-of-band management traffic to at least one of the one or more additional processing devices.

13. The apparatus of claim 1 wherein at least one of the one or more additional processing devices is part of a cloud-based information technology support system responsible for providing support services for the managed information technology asset.

14. The apparatus of claim 1 wherein the at least one processing device is further configured:
to separate the additional out-of-band management traffic into the first type of out-of-band management traffic and the second type of out-of-band management traffic;
to communicate, utilizing the first connection port, the first type of out-of-band management traffic in the additional out-of-band management traffic to a first out-of-band management port of the managed information technology asset; and
to communicate, utilizing the second connection port, the second type of out-of-band management traffic in the additional out-of-band management traffic to a second out-of-band management port of the managed information technology asset.

15. A computer program product comprising a non-transitory processor-readable storage medium having stored therein program code of one or more software programs, wherein the program code when executed by at least one processing device causes the at least one processing device:
to receive, utilizing a first one of two or more connection ports, a first type of out-of-band management traffic from a managed information technology asset;
to receive, utilizing a second one of the two or more connection ports, a second type of out-of-band management traffic from the managed information technology asset;
to communicate, via at least one wireless network interface, the first and second types of out-of-band management traffic to one or more additional processing devices;
to receive, via the at least one wireless network interface, additional out-of-band management traffic from at least one of the one or more additional processing devices;
to determine whether the additional out-of-band management traffic includes any out-of-band management traffic of the first and second types of out-of-band management traffic;
responsive to determining that at least a first portion of the additional out-of-band management traffic includes the first type of out-of-band management traffic, to communicate the first portion of the additional out-of-band management traffic to the managed information technology asset utilizing the first connection port; and
responsive to determining that at least a second portion of the additional out-of-band management traffic includes the second type of out-of-band management traffic, to communicate the second portion of the additional out-of-band management traffic to the managed information technology asset utilizing the second connection port.

16. The computer program product of claim 15 wherein the first connection port comprises a serial port, the first type of out-of-band management traffic comprises console traffic from the managed information technology asset, the second connection port comprises an ethernet port, and the second type of out-of-band management traffic comprises ethernet traffic from the managed information technology asset.

17. The computer program product of claim 15 wherein the managed information technology asset comprises a network switch.

18. A method performed by at least one processing device comprising a process coupled to a memory, the method comprising:
receiving, utilizing a first one of two or more connection ports, a first type of out-of-band management traffic from a managed information technology asset;
receiving, utilizing a second one of the two or more connection ports, a second type of out-of-band management traffic from the managed information technology asset;
communicating, via at least one wireless network interface, the first and second types of out-of-band management traffic to one or more additional processing devices;
receiving, via the at least one wireless network interface, additional out-of-band management traffic from at least one of the one or more additional processing devices;

determining whether the additional out-of-band management traffic includes any out-of-band management traffic of the first and second types of out-of-band management traffic;

responsive to determining that at least a first portion of the additional out-of-band management traffic includes the first type of out-of-band management traffic, communicating the first portion of the additional out-of-band management traffic to the managed information technology asset utilizing the first connection port; and responsive to determining that at least a second portion of the additional out-of-band management traffic includes the second type of out-of-band management traffic, communicating the second portion of the additional out-of-band management traffic to the managed information technology asset utilizing the second connection port.

19. The method of claim 18 wherein the first connection port comprises a serial port, the first type of out-of-band management traffic comprises console traffic from the managed information technology asset, the second connection port comprises an ethernet port, and the second type of out-of-band management traffic comprises ethernet traffic from the managed information technology asset.

20. The method of claim 18 wherein the managed information technology asset comprises a network switch.

* * * * *